(No Model.) 2 Sheets—Sheet 1.

J. BRAUER.
MASH MACHINE.

No. 550,817. Patented Dec. 3, 1895.

Witnesses. Inventor:
J. Thomson Cross John Brauer.
B. W. Sommers By Geo. J. Pinkinson
Attorney.

(No Model.) 2 Sheets—Sheet 2.
J. BRAUER.
MASH MACHINE.

No. 550,817. Patented Dec. 3, 1895.

Witnesses.
J. Thomson Cross
P. W. Sommers

Inventor:
John Brauer
By Geo. J. Farkinson
Attorney.

UNITED STATES PATENT OFFICE.

JOHN BRAUER, OF CINCINNATI, OHIO.

MASH-MACHINE.

SPECIFICATION forming part of Letters Patent No. 550,817, dated December 3, 1895.

Application filed May 29, 1893. Serial No. 475,859. (No model.)

*To all whom it may concern:*

Be it known that I, JOHN BRAUER, a citizen of the United States of America, residing at Cincinnati, in the county of Hamilton and State of Ohio, have invented a new and useful Mash-Machine, of which the following is a specification.

My invention relates to apparatus for raising, lowering, and driving the agitating mechanism in mash-machines, and my object is to provide mechanism which may be driven from above or below, as the circumstances may require, and in which the agitators may be caused to engage with a portion of the material at the beginning of the operation and the contact increased until the entire mass is subjected to their action.

The invention consists in the mechanism and the combination and arrangement of parts hereinafter described and claimed.

Figure 1:
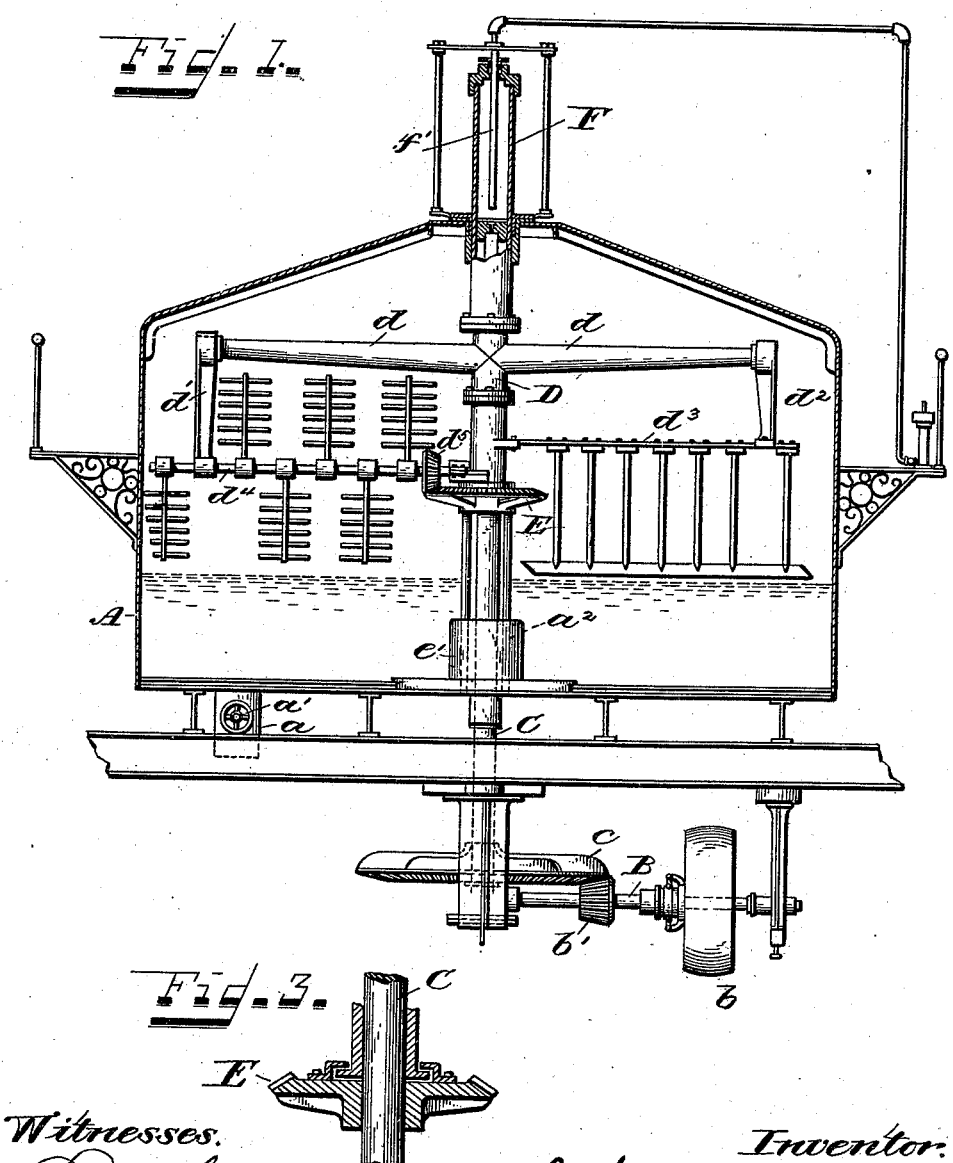
Figure 2:
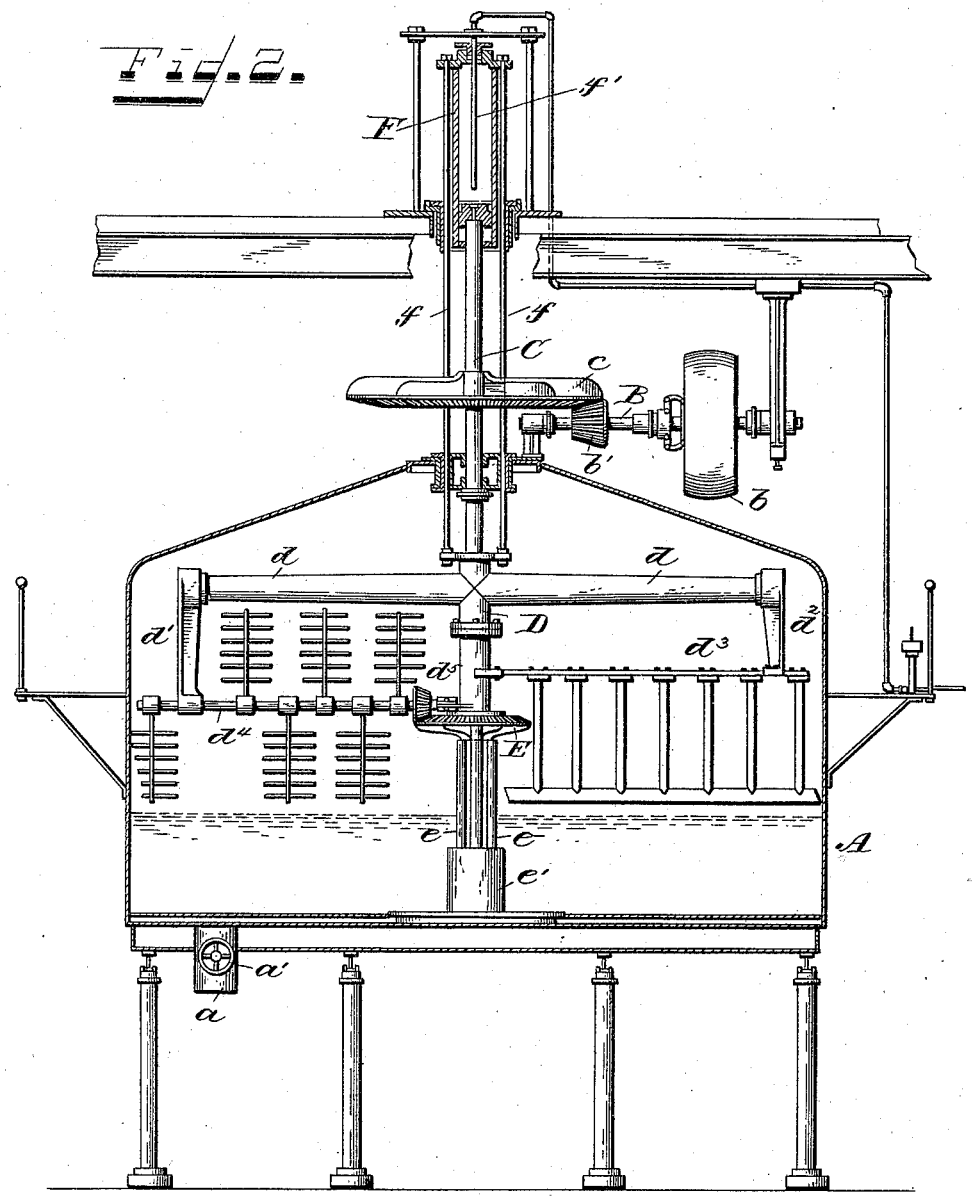

In the drawings, Figure 1 is a central vertical sectional view of my improved mechanism, showing the driving mechanism arranged below the mash-tub. Fig. 2 is a similar view showing the driving mechanism arranged above the tub, and Fig. 3 is a detail view.

A designates an ordinary mash-tub, preferably cylindrical in form, provided with a discharge-duct $a$, controlled by a valve $a'$.

B is a shaft adapted to be driven by a pulley $b$ or equivalent device, connected with a source of power. A bevel-pinion $b'$ upon the shaft is adapted to engage with a bevel-wheel $c$, secured to a vertical shaft C, leading into the mash-tub. D is a sleeve adapted to slide longitudinally upon shaft C, but held against rotation thereon by a spline. This sleeve is provided with radial arms $d$, carrying dependent arms $d'$ and $d^2$, serving, respectively, as the outer supports for the scraper-arms $d^3$ and the beater-arms $d^4$.

E is a bevel-gear supported by and adapted to slide with the sleeve D, but held against rotation therewith by rods $e$, adapted to slide in guideways $a^2$ in step-block $e'$.

A bevel-pinion $d^5$ upon the beater-shaft engages with wheel E and imparts rotation to the beater-shaft.

F is a cylinder taking over a packed head on the end of shaft C, connected with and adapted to slide with the sleeve D, and provided with a supply-pipe $f^2$. This cylinder may be charged with air, gas, liquid, or any medium which can be conveniently supplied under pressure. In the form shown in Fig. 1 the cylinder is directly connected with the sleeve, while in Fig. 2 it is connected by means of bolts $f$, which take through and rotate with the bevel-wheel $c$.

The operation is as follows: The agitating mechanism being in a raised position, as shown, motion is imparted thereto by the shaft, which may be rotated either from above or below the tub, as described. As the shaft is rotated, the pressure in the cylinder is gradually decreased by permitting the supporting medium to escape, allowing the cylinder to slide downward on the shaft, carrying with it the agitating mechanism. Thus a portion only of the mass is agitated at the beginning and action increased until the entire mass is agitated.

I claim as my invention—

1. In a mash machine, the combination of a shaft having a packed head; a pressure cylinder taking over the head and adapted to reciprocate thereon, a sleeve connected with the pressure cylinder and adapted to reciprocate therewith; agitating mechanism supported by the sleeve; driving mechanism therefor; and a connection between the pressure cylinder and a source of pressure, substantially as and for the purpose specified.

2. In a mash machine, the combination of a shaft having a packed head; a pressure cylinder taking over the head and adapted to reciprocate thereon; a sleeve connected with the pressure cylinder and adapted to reciprocate therewith; agitating mechanism supported by the sleeve; driving mechanism situated between the pressure cylinder and agitating mechanism and a connection between the pressure cylinder and a source of pressure, substantially as and for the purpose specified.

3. In a mash machine, the combination of a shaft having a packed head; a pressure cylinder taking over the head and adapted to reciprocate thereon; a sleeve connected with the pressure cylinder by bolts adapted to rotate with the shaft and reciprocate with the cylinder; agitating mechanism supported by the sleeve; driving mechanism situated between the pressure cylinder and agitating mechanism and a connection between the pressure cylinder and a source of pressure, substantially as and for the purpose specified.

4. In a mash machine, the combination of a shaft having a packed head; a pressure cylinder taking over the head and adapted to reciprocate thereon; a driving gear mounted on the shaft between the cylinder and agitating mechanism; a sleeve connected with the pressure cylinder; bolts connecting the sleeve with the pressure cylinder and taking through the driving gear; agitating mechanism supported by the sleeve and a connection between the pressure cylinder and a source of pressure, substantially as and for the purpose specified.

JOHN BRAUER.

Witnesses:
  B. W. SOMMERS,
  JAMES N. RAMSEY.